United States Patent
Claussen et al.

(10) Patent No.: US 10,521,663 B1
(45) Date of Patent: Dec. 31, 2019

(54) ITERATIVE IMAGE POSITION DETERMINATION

(71) Applicant: Intel IP Corporation, Santa Clara, CA (US)

(72) Inventors: Cornelius Claussen, Bad Schoenborn (DE); Marco Moeller, St. Leon-Rot (DE)

(73) Assignee: Intel IP Corporation, Santa Clara, CA (US)

( * ) Notice: Subject to any disclaimer, the term of this patent is extended or adjusted under 35 U.S.C. 154(b) by 175 days.

(21) Appl. No.: 15/856,123

(22) Filed: Dec. 28, 2017

(51) Int. Cl.
*G06K 9/00* (2006.01)

(52) U.S. Cl.
CPC .. *G06K 9/0063* (2013.01); *G06T 2207/10032* (2013.01); *G06T 2207/30181* (2013.01)

(58) Field of Classification Search
CPC ............ G06T 2207/10032; G06T 2207/30181
See application file for complete search history.

(56) References Cited

U.S. PATENT DOCUMENTS

| | | | | |
|---|---|---|---|---|
| 8,723,953 | B2* | 5/2014 | Klomp | H04N 7/18 348/144 |
| 2016/0349375 | A1* | 12/2016 | Littlefield | G01S 19/03 |
| 2017/0178358 | A1* | 6/2017 | Greveson | G06K 9/00476 |
| 2017/0301111 | A1* | 10/2017 | Zhao | G01C 25/005 |
| 2018/0292526 | A1* | 10/2018 | Papadelis | G01S 17/023 |
| 2018/0307230 | A1* | 10/2018 | Iwakura | G05D 1/0202 |

OTHER PUBLICATIONS

Lari et al. "An adaptive approach for the segmentation and extraction of planar and linear/cylindrical features from laser scanning data", ISPRS Journal of Photogrammetry and Remote Sensing 93 (2014) 192-212 (Year: 2014).*
Awrangjeb et al. "Automatic extraction of building roofs using LIDAR data and multispectral imagery", ISPRS Journal of Photogrammetry and Remote Sensing 83 (2013) 1-18 (Year: 2013).*

* cited by examiner

Primary Examiner — Qian Yang
(74) Attorney, Agent, or Firm — Viering, Jentschura & Partner mbB (57) ABSTRACT

Herein is disclosed an image location iteration system comprising one or more processors configured to receive from one or more unmanned aerial vehicles a plurality of images and corresponding detected positions; determine an alignment of the plurality of images according to one or more image features; calculate a first set of measured locations for the plurality of images according to the alignment and the detected positions; and calculate a second set of measured locations the plurality of images according to the alignment and a first subset of the detected positions.

20 Claims, 8 Drawing Sheets

| DL | DL | DL | DL |
|----|----|----|----|
| DL | DL | DL | DL |
| DL | DL | DL | DL |
| DL | DL | DL | DL |

Fig. 5

| DL ML | DL ML | DL ML | DL ML |
|-------|-------|-------|-------|
| DL ML | DL ML | DL ML | DL ML |
| DL ML | DL ML | DL ML | DL ML |
| DL ML | DL ML | DL ML | DL ML |

Fig. 6

| DL ML | DL ML — 701 | DL ML | DL ML |
|-------|-------|-------|-------|
| DL ML | DL ML | DL ML | DL ML |
| DL ML | DL ML | DL ML | DL ML — 702 |
| DL ML | DL ML | DL ML | DL ML |

Fig. 7

| DL ML | | DL ML | DL ML |
|---|---|---|---|
| DL ML | DL ML | DL ML | DL ML |
| DL ML | DL ML | DL ML | |
| DL ML | DL ML | DL ML | DL ML |

Fig. 8

| DL ML | ML2 | DL ML | DL ML |
|---|---|---|---|
| DL ML | DL ML | DL ML | DL ML |
| DL ML | DL ML | DL ML | ML2 |
| DL ML | DL ML | DL ML | DL ML |

ITERATIVE IMAGE POSITION DETERMINATION

TECHNICAL FIELD

Various aspects of the disclosure relate generally to iterative refinement of positional system data using combined image data.

BACKGROUND

UAVs may be used to photograph or map an area or region. Under some circumstances, this may be achieved with a single photograph taken from a single vantage point, such that the entire area may be captured in a single photo. In many other circumstances, this may be impracticable or impossible, and it may be desired or necessary to photograph or map the large area by combining several photographs of the area. In many applications, it is necessary to know the location from which each of the several photographs is taken. Although UAVs are commonly equipped with position detection systems, such as Global Positioning System ("GPS") equipment, these systems may have an accuracy tolerance that is unsuitable for the mapping task. To account for the accuracy tolerance in GPS, it is known to place a plurality of markers in the area to be photographed, wherein an exact location for each of the markers is known. In so doing, the marker can be identified in the image data, and the exact position of the market can be incorporated into the image set. Placing the markers, however, may be cumbersome, costly, or even dangerous. It is therefore desired to achieve satisfactory positioning system information for area mapping or photography without prepositioned positioning markers.

SUMMARY

Herein is disclosed an image location iteration system including one or more processors configured to receive from one or more unmanned aerial vehicles a plurality of images and corresponding detected positions; determine an alignment of the plurality of images according to one or more image features; calculate a first set of measured locations for the plurality of images according to the alignment and the detected positions; and calculate a second set of measured locations the plurality of images according to the alignment and a first subset of the detected positions.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any example or design described herein as "exemplary" is not necessarily to be construed as preferred or advantageous over other examples or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like.

The term "map" used with regard to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as unstaffed, uninhabited or unpiloted aerial vehicle, -aircraft or -aircraft system or drone.

The unmanned aerial vehicle, according to various aspects, may include a support frame that serves as basis for mounting components of the unmanned aerial vehicle, as for example, motors, sensors, mechanic, transmitter, receiver, and any type of control to control the functions of the unmanned aerial vehicle as desired.

Figure 1:
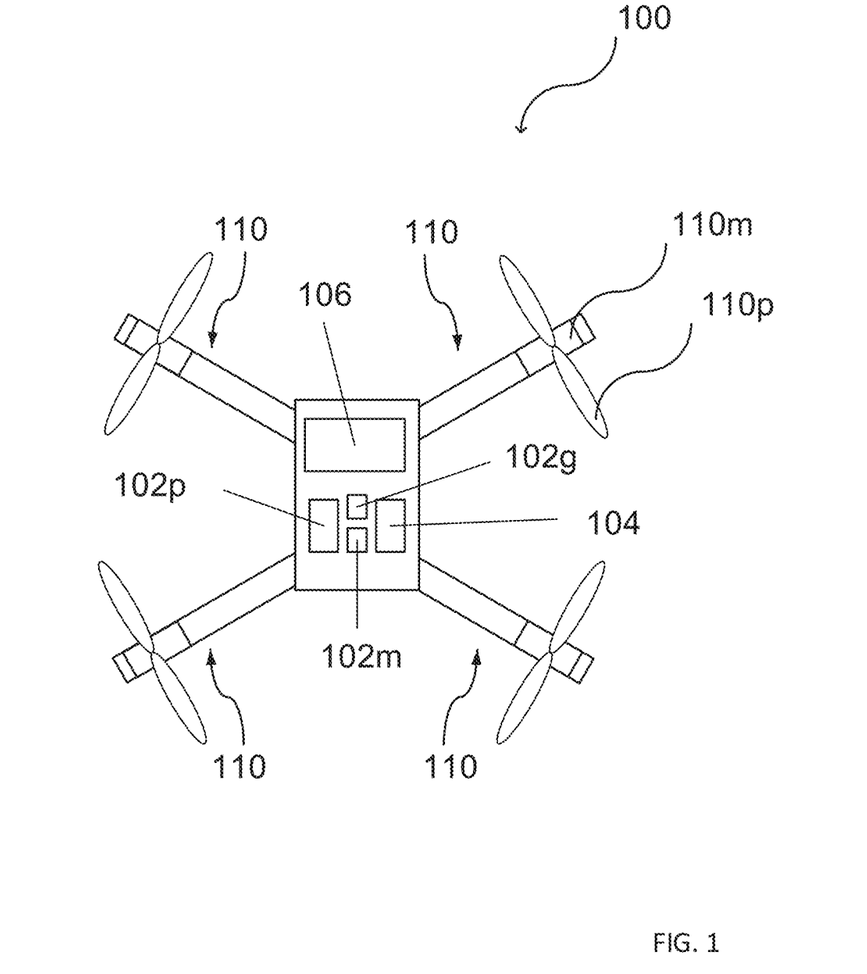
FIG. 1 shows a UAV according to one aspect of the disclosure.

FIG. 1 illustrates an unmanned aerial vehicle 100 in a schematic view, according to various aspects of the disclosure. The unmanned aerial vehicle 100 may include a plurality of (e.g., three or more than three, e.g., four, six, eight, etc.) vehicle drive arrangements 110. Each of the vehicle drive arrangements 110 may include at least one drive motor $110m$ and at least one propeller $110p$ coupled to the at least one drive motor $110m$. The one or more drive motors $110m$ of the unmanned aerial vehicle 100 may be electric drive motors.

Further, the unmanned aerial vehicle 100 may include one or more processors $102p$ configured to control flight or any other operation of the unmanned aerial vehicle 100 including but not limited to navigation, image analysis, location calculation, and any method or action described herein. One or more of the processors $102p$ may be part of a flight controller or may implement a flight controller. The one or more processors $102p$ may be configured, for example, to provide a flight path based at least on an actual position of the unmanned aerial vehicle 100 and a desired target position for the unmanned aerial vehicle 100. In some aspects, the one or more processors $102p$ may control the unmanned aerial vehicle 100. In some aspects, the one or more processors $102p$ may directly control the drive motors $110m$ of the unmanned aerial vehicle 100, so that in this case no additional motor controller may be used. Alternatively, the one or more processors $102p$ may control the drive motors $110m$ of the unmanned aerial vehicle 100 via one or more additional motor controllers. The one or more processors $102p$ may include or may implement any type of controller suitable for controlling the desired functions of the unmanned aerial vehicle 100. The one or more processors $102p$ may be implemented by any kind of one or more logic circuits.

According to various aspects, the unmanned aerial vehicle 100 may include one or more memories 102*m*. The one or more memories may be implemented by any kind of one or more electronic storing entities, e.g. a one or more volatile memories and/or one or more non-volatile memories. The one or more memories 102*m* may be used, e.g., in interaction with the one or more processors 102*p*, to build and/or store image data, ideal locations, locational calculations, or alignment instructions.

Further, the unmanned aerial vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the unmanned aerial vehicle 100 may include one or more sensors 106. The one or more sensors 106 may be configured to monitor a vicinity of the unmanned aerial vehicle 100. The one or more sensors 106 may be configured to detect obstacles in the vicinity of the unmanned aerial vehicle 100. The one or more sensors 106 may include, for example and without limitation, one or more cameras (e.g., a still camera, a video camera, a conventional color camera, a depth camera, a stereo camera, a thermal imaging camera, etc.), one or more ultrasonic sensors, etc. The unmanned aerial vehicle 100 may further include a position detection system 102*g*. The position detection system 102*g* may be based, for example, on Global Positioning System (GPS) or any other available positioning technology. Therefore, the one or more processors 102*p* may be further configured to modify the flight path of the unmanned aerial vehicle 100 based on data obtained from the position detection system 102*g*. The sensors 106 may be mounted as depicted herein, or in any other configuration suitable for an implementation.

According to various aspects, the one or more processors 102*p* may include at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 102*p* may further include an inertial measurement unit (IMU) and/or a compass unit. The inertial measurement unit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight modus. However, any other suitable function for navigation of the unmanned aerial vehicle 100, e.g., for determining a position, a flight velocity, a flight direction, etc., may be implemented in the one or more processors 102*p* and/or in additional components coupled to the one or more processors 102*p*.

Figure 2:
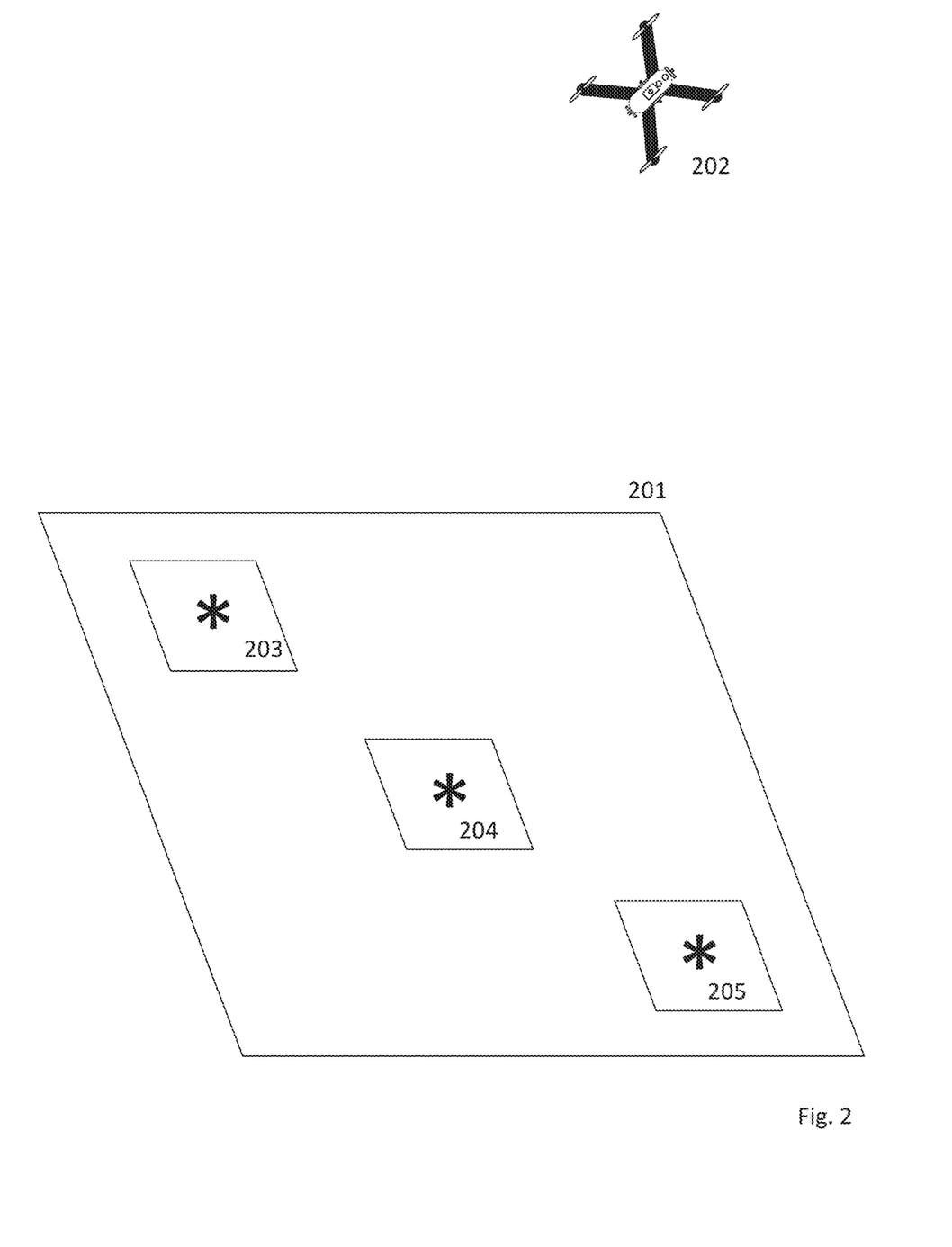
FIG. 2 shows a known method of calculating a measured location.

FIG. 2 shows a known method of a UAV taking images of an image region 201 including a plurality of markers 203-205 with known locational information. The image region 201 may be a predetermined region. The image region may correspond to any area, including but not limited to, a land surface, a water surface, one or more buildings, one or more landscape features, positioning coordinates, or otherwise. Although the UAV may be equipped to obtain positional information during flight, and may be capable of associating the positional information with its images, the positional information may exhibit an accuracy tolerance that is unsuitable for an imaging or mapping operation. For example, a UAV may be equipped with a GPS receiver that exhibits an accuracy tolerance of approximately ten meters, which may be unworkable for a given mapping task. To improve the accuracy of positional information, it is known to place positional markers 203-205 within the image region 201. The markers may include a visual detail that is identifiable in image data, such that the details can be associated with a known and highly accurate position of the image marker for improvement of GPS positioning information. Placement of the markers must generally be performed manually and may be cumbersome, costly, dangerous, or otherwise undesirable.

Figure 3:
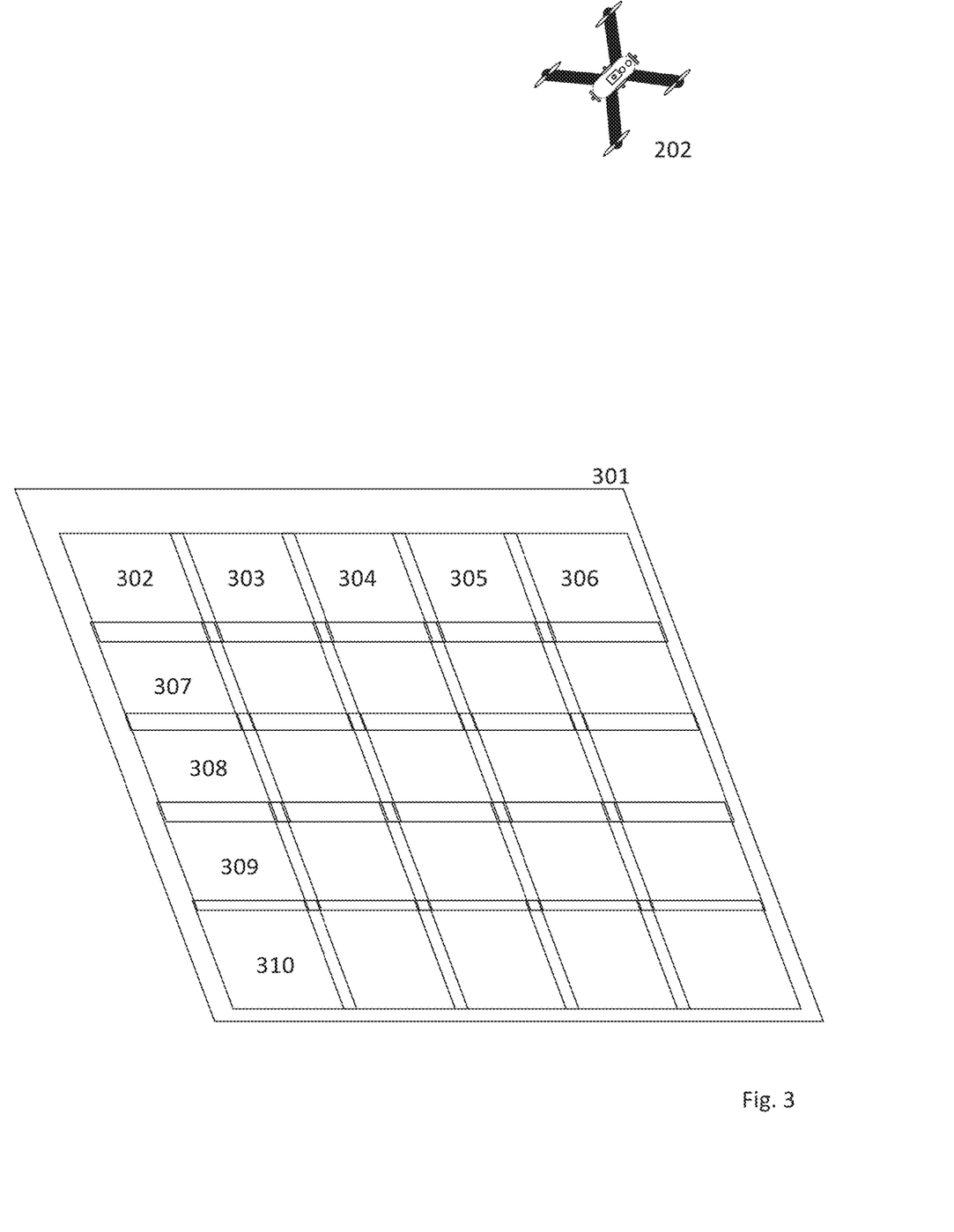
FIG. 3 shows an image region of overlapping images.

FIG. 3 shows a method of mapping according to an aspect of the disclosure. The image region 301 does not include markers, such as those previously shown as 203-205. The image region 201 is photographed by one or more UAVs 202. The one or more UAVs 202 obtain a plurality of photographs of the image region 301. The plurality of images are depicted herein as 302-310. The plurality of images 302-310 overlap, and therefore contain similar image attributes or features. The amount of overlap may be largely variable or flexible, and the processing tools described herein may be capable of ascertaining alignment of photographs with a very large or small percentage of overlap. The unmanned aerial vehicle 202 may be configured to take photographs in accordance with its traveling speed, such that a photograph is taken once a given percentage of the image area remains for overlap for a second photograph. The given percentage may be any percentage such as, for example, 20%. The UAV may be programmed to photograph at a given time frequency, such as one photograph per second, or otherwise. The one or more UAVs 202 are configured to take photographs of the area of the image region 301 such that most or all of the image region 301 area has been photographed. The photographs are depicted in FIG. 3 as overlapping based on the double lines between photographs. The double lines are not drawn to scale and are not intended to represent a specific percentage of overlap. The image region 301 may be covered by any number of photographs, ranging from two to an infinite number. In this case, the image region 301 is covered by twenty-five photographs. The twenty-five photographed areas are numbered only from 302 to 310 for simplicity. Although certain photographic areas are not labeled with a number in FIG. 3, the lack of a number is not intended to suggest any difference from a numbered area.

Figure 4:
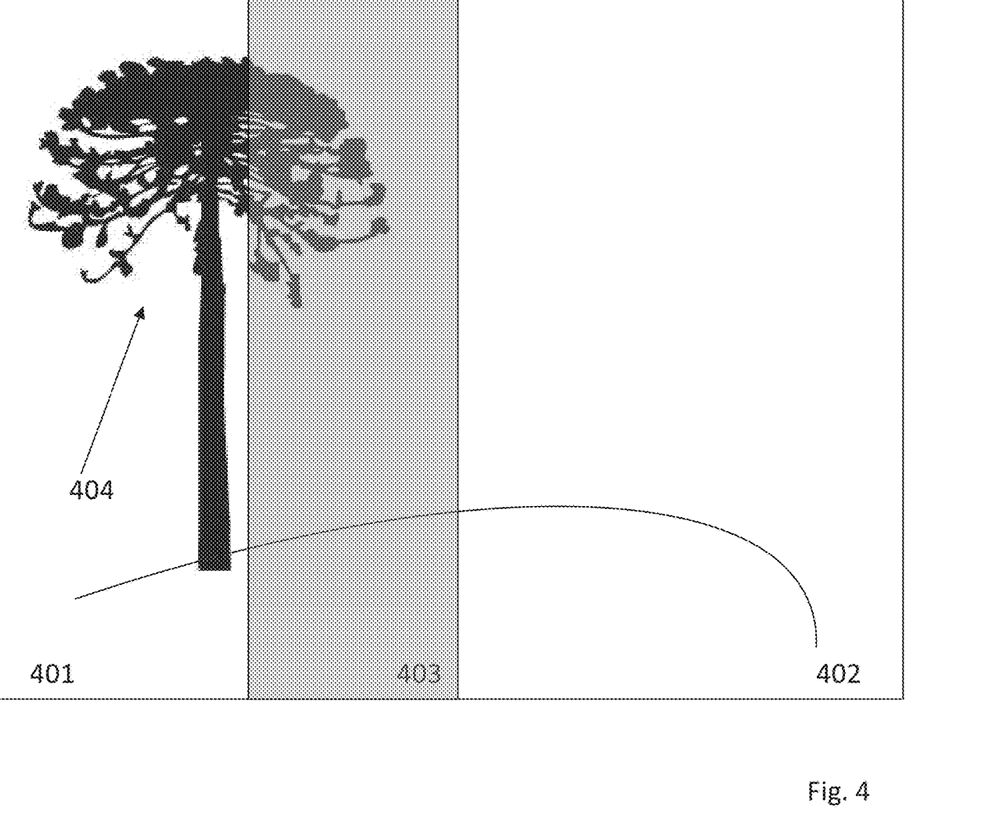
FIG. 4 shows an alignment of overlapping images.

The overlapping photographs in the image region 301 are then combined and aligned based on a similarity of features. A simplified version of this process is depicted in FIG. 4, in which image 401 is combined with image 402 based on an overlapping portion 403. In this case, image 401 includes a recreational area and a tree 404. Image 402 includes a different section of the recreational area and the same tree 404. Based on at least the overlapping portions including the tree 404, photographs 401 and 402 may be combined and aligned. This procedure may be performed entirely by computer processors carrying out one or more software programs, and without human input. The computer programs may be configured to align the photographs based on any overlapping or similar shapes, colors, regions, shadings, or otherwise. When the image alignment is complete, the images will generally reflect the totality of the image region 301.

Figure 5:
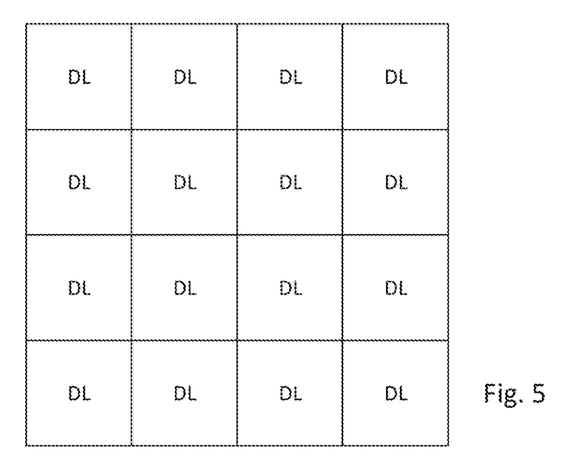
FIG. 5 shows aligned images with corresponding determined locations within an image region.

FIG. 5 through FIG. 9 show an iterative process of refining image locations. FIG. 5 depicts the image region 301, in this case including sixteen photographs that have been aligned based on overlapping material as described above. The sixteen photographs together depict the image region 301. Each of the sixteen photographs corresponds to a detected position (or positioning system location, such as GPS). The one or more unmanned aerial vehicles are equipped with image sensors that obtain the images. Each of the one or more unmanned aerial vehicles is also equipped with a positioning system, which is capable of determining a detected position of the unmanned aerial vehicle at the time that the image was taken. The detected position is associated with the image, such that each image within the image region 301 corresponds to a detected position corresponding to the location of the unmanned aerial vehicle at the time that the image was taken. The detected position is depicted in FIG. 5 as a "DP". Thus, each of the sixteen images in FIG. 5 correspond to a DP.

Figure 6:
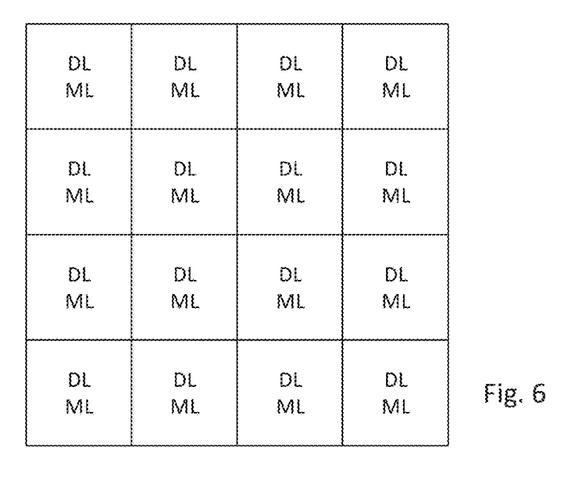
FIG. 6 shows aligned images with corresponding determined locations and measured locations.

FIG. 6 shows the determination of a measured location based on the detected positions and alignment. The one or more processors may be configured to calculate a measured location of each of the images within the image region 301. The measured location is an absolute location, the calculation of which is informed by at least a relative alignment of the plurality of images. Using the relative alignment of images as described above, and considering the detected positions corresponding to each of the aligned images, a measured location may be determined. The measured location may be an absolute location created by considering a tolerance of detected positions. The measured location may differ from the detected position. It is known that detected positions based on, for example, the global positioning system, provide accurate results only within a specific tolerance, and therefore the detected positions input as data points for the calculation of measured locations may have various degrees of reliability. The degrees of reliability corresponding to the various images may be nonhomogeneous or differing, such that some detected positions may be more accurate than other detected positions. A person skilled in the art will appreciate the process of determining a first set of measured location based on a relative alignment and a plurality of detected locations.

The detected positions may be compared to their corresponding measured locations. It may be assumed that detected positions that are identical to, or only marginally differ from, their corresponding measured locations, may be more accurate than detected positions that significantly differ from their corresponding measured locations. Thus, a magnitude of difference between the detected location and corresponding measured location may be determined, and the combinations of detected positions and measured locations may be ranked according to the magnitude of difference. That is, with respect to the images in FIG. 6, the sixteen images may be ranked according to a magnitude of difference between the detected position and corresponding measured location, such that, for example, the first ranking corresponds to a detected position and measured location pair that are the most similar; the second ranking corresponds to a detected position and measured location pair that are the second most similar, and so on.

Figure 7:
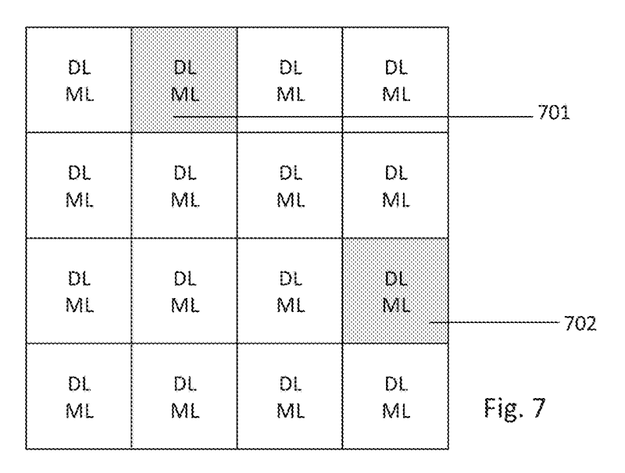
FIG. 7 shows an identification of determined locations having a greatest magnitude of difference from the corresponding measured locations.

FIG. 7 shows the creation of a first subset of detected positions. Where the pairings of detected positions and corresponding measured locations are ranked according to their similarity, as described above, a first subset of detected positions may be created by disregarding or deleting a percentage of detected positions having the greatest magnitude of difference from their corresponding measured location. The percentage may be any percentage selected for an implementation. The percentage may, without limitation, be less than 10%, 10%, or greater than 10%. Where for example the percentage is 10%, and with respect to FIG. 6, the sixteen pairs of detected positions and measured locations may be ranked according to a magnitude of difference, and the bottom 10% of detected positions (1.6 images, rounded to 2 detected positions) may be disregarded or deleted. FIG. 7 shows the second image in the first row 701 and the final image in the third row 702 corresponding to the largest and second largest differences between the detected position and the measured location. Accordingly, the detected positions for 701 and 702 may be disregarded or deleted for further iterations. In light of this determination, a first subset of the detected positions is created, wherein the first subset contains the remaining 14 detected positions (the 16 positions shown in FIG. 5, less the detected position corresponding to 701 and the detected position corresponding to 702).

Figure 8:
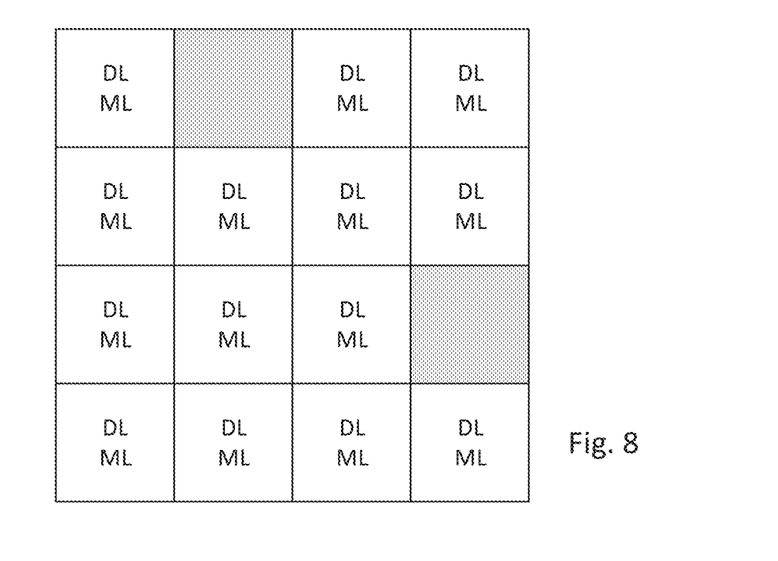
FIG. 8 shows a first subset of determined locations.

FIG. 8 shows the locational data points corresponding to the first subset of detected positions. In this case, it can be seen that the detected positions corresponding to 701 and 702 have been deleted or disregarded. Once the first subset of detected positions is established, the process of determining measured locations may be iteratively repeated based on the first subset of detected locations.

Figure 9:
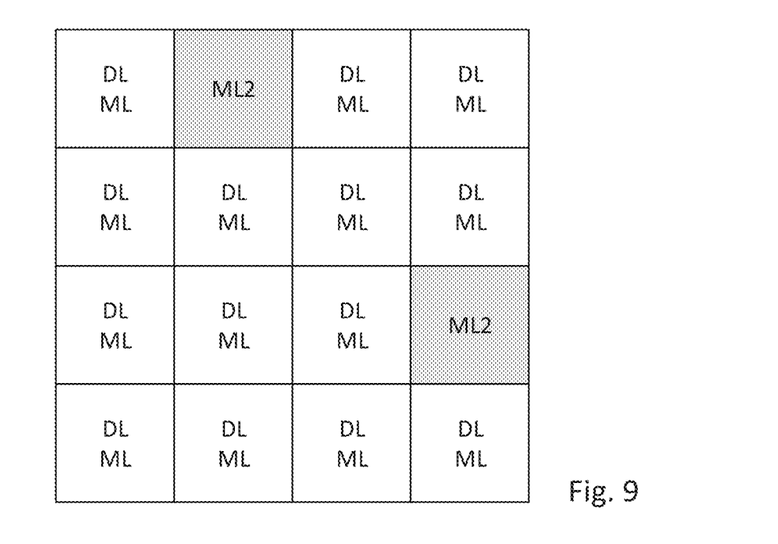
FIG. 9 shows the calculation of a second set of measured locations based on the first subset of determined locations.

FIG. 9 shows the calculation of a second set of measured locations based on the first subset of detected positions. In this case, the fourteen detected positions within the first subset are used to calculate a second set of measured locations (depicted as "ML2"). The second set of measured locations are determined based on at least the first subset of detected positions and the alignment of images. Depending on the implementation, the calculation of a second set of measured locations may also include one or more first measured locations. Based at least on the first subset of detected positions and corresponding measured locations, a second set of measured locations (ML2) is determined. This process may be iteratively performed, such that it is repeated to improve the accuracy of the measured locations. Thus, the second set of measured locations (ML2) may be ranked according to a magnitude of difference between the second set of measured locations and corresponding detected positions. As described above, a percentage of the detected positions corresponding to the largest magnitude of difference from the second set of measured locations may be deleted or disregarded, thereby creating a second subset of detected locations. A third set of measured locations may then be calculated based on the image alignment and the second set of detected positions, and so on. This iterative process permits the measured locations to be calculated using the detected positions that are most likely to be accurate. By limiting the detected position data set to the most accurate detected positions, it is expected that the accuracy of the corresponding measured locations will increase.

Figure 10:
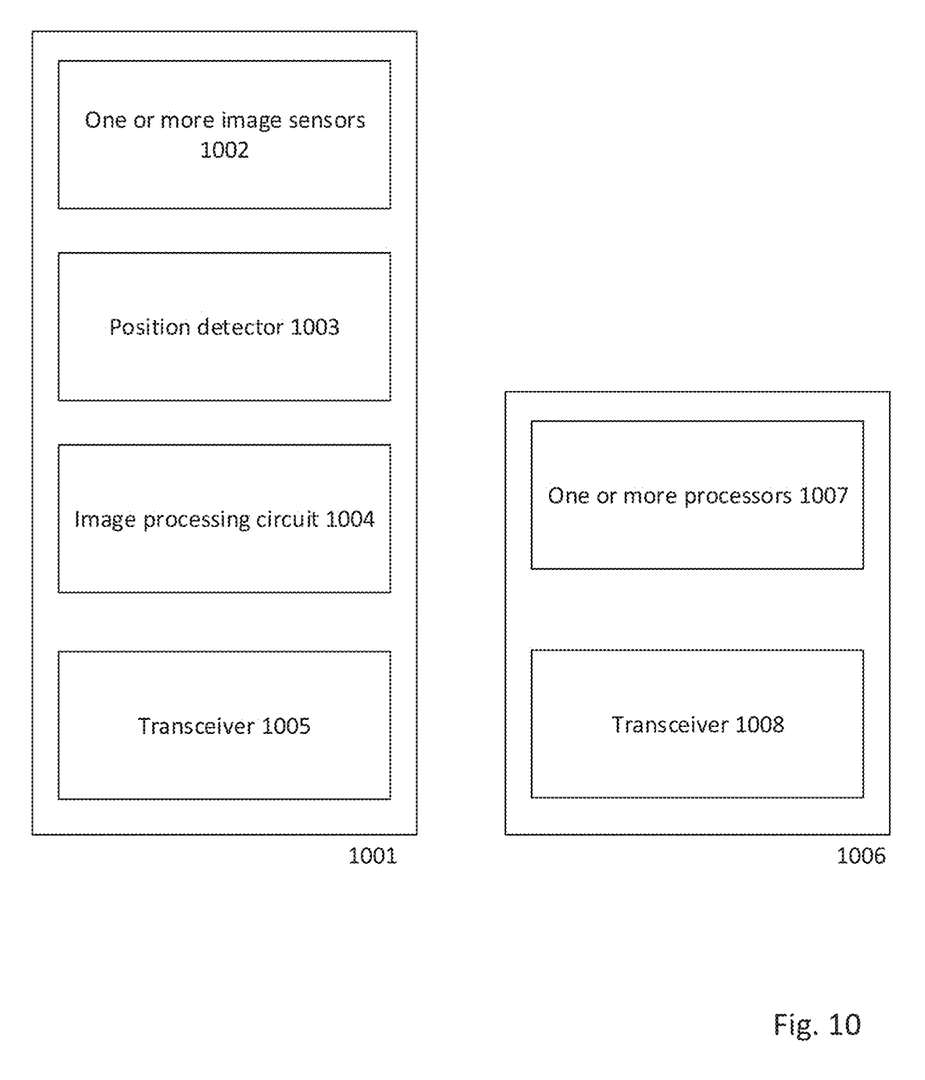
FIG. 10 shows a system for image location iteration.

In FIG. 10, a system for image location iteration is depicted, including one or more unmanned aerial vehicles 1001, each of the one or more unmanned aerial vehicles including one or more image sensors 1002, configured to obtain at least one image; a position detector 1003, configured to detect a position of the unmanned aerial vehicle when the at least one image is generated; and an image positioning circuit 1004, configured to associate image data with a corresponding detected position. The system further includes a processing center 1006 including one or more processors 1007 configured to receive from the one or more unmanned aerial vehicles 1001 a plurality of images and corresponding detected positions; determine an alignment of the plurality of images according to one or more image features; calculate a first set of measured locations for the plurality of images according to the detected positions and the alignment; and calculate a second set of measured locations for the plurality of images according to a first subset of the detected positions and the alignment. According to one aspect of the disclosure, the one or more unmanned aerial vehicles 1001 may further include a transceiver 1005, configured to transmit image data and/or detected position data to the processing center 1006. According to another aspect of the disclosure, the processing center 1006 may further include a transceiver 1008 configured to receive from the one or more unmanned aerial vehicles 1001 image data and/or detected position data.

Figure 11:
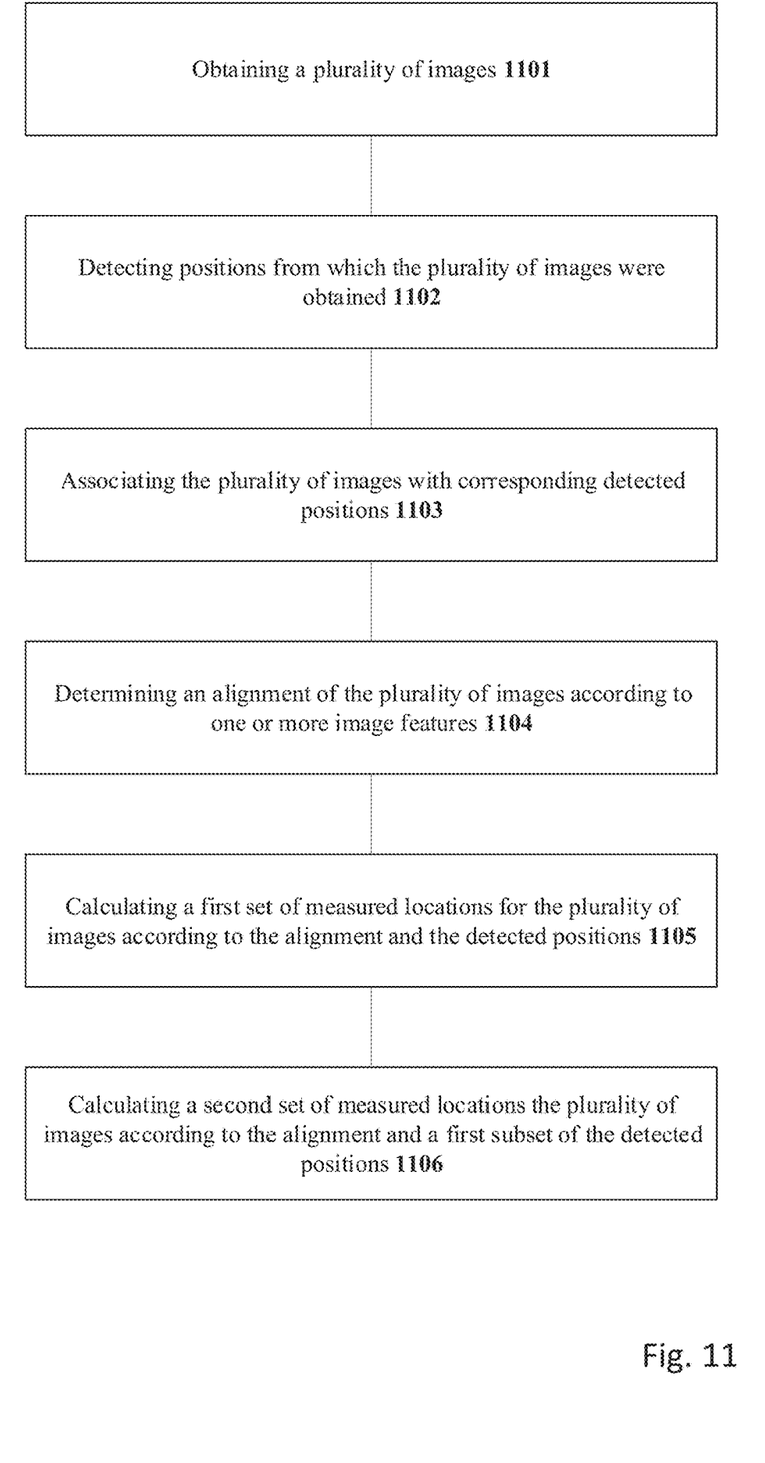
FIG. 11 shows a method for image location iteration.

FIG. 11 shows a method for image location iteration including obtaining a plurality of images 1101; detecting positions from which the plurality of images were obtained 1102; associating the plurality of images with corresponding detected positions 1103; determining an alignment of the plurality of images according to one or more image features 1104; calculating a first set of measured locations for the plurality of images according to the alignment and the detected positions 1105; and calculating a second set of measured locations the plurality of images according to the alignment and a first subset of the detected positions 1106.

The first or subsequent subsets of detected positions may be determined based on an ordering or ranking of the detected positions based on a magnitude of difference between the detected positions and their corresponding measured locations. That is, once the measured locations are determined, each measured location is compared with its corresponding detected position, and a magnitude of difference between the detected position and the corresponding measured location is ascertained. A difference between a detected position and corresponding measured location is due at least to an inaccuracy of one or more detected positions, which may be based on an accuracy tolerance of the detected position system. The detected positions are ranked based on a difference between the detected position and corresponding measured location. The ranking may be from a smallest magnitude of difference to a greatest magnitude of difference, or vice versa. The result of this ordering is a ranking showing an ordered listing of detected positions, wherein the order is determined based on a magnitude of difference between the detected position and associated measured location. It may be assumed that, where a magnitude of difference between a detected position and corresponding measured location is comparatively small, the detected position has a higher probability of accuracy. Conversely, where the magnitude of difference between a detected position and its corresponding measured location is large, there is a corresponding improbability of the detected position's accuracy.

A percentage of the detected positions corresponding to a greatest magnitude of difference from the associated measured location may be deleted or disregarded. The percentage may be any number chosen for the implementation. According to one aspect of the disclosure, the percentage may be 10%, wherein the 10% of detected positions showing the greatest magnitude of difference from their corresponding measured locations will be deleted or disregarded for future analysis. Whatever the percentage of detected positions that are deleted or disregarded, the remaining detected positions are maintained as members of a subgroup. For example, where 10% of the detected positions are deleted or disregarded, the remaining 90% are maintained for inclusion within the next subset. That is to say, the first subset of detected positions contains the original listing of detected positions, less any positions that are deleted or disregarded based on the magnitude of difference between the detected position and corresponding measured location.

This iterative process may be repeated to further refine the resulting sets of measured locations. For example, after the second set of measured locations is calculated, a third set of measured locations may be calculated based on the image alignment and a second set of detected positions. Once the second set of measured locations is calculated, the first subset of detected positions and the second set of measured locations may be ranked in the manner described above, based on a magnitude of difference between a position in the first subset of detected positions and its corresponding second measured location. A percentage of the detected positions within this first subset may be deleted or disregarded in the manner described above. The percentage used for deletion may be the same percentage used to create the first subset of detected positions, or the percentage may be different. The remaining detected positions (following the deletion or disregarding of the detected positions in the first subset having the greatest magnitude of difference from their corresponding measured locations) create the second subset of detected positions. Using the same manner described above, the process may be performed again, creating a third set of measured locations based on the alignment and the second subset of detected positions. This process may be continued until a termination factor is reached.

A termination factor may be any criterion or criteria designed to terminate the iterative process. The termination factor may be a termination percentage, a number of iterations, and assessment of data quality, a duration, or otherwise.

Where the termination factor is a termination percentage, the termination percentage may be a percentage of remaining detected positions. That is, the one or more processors may be configured to repeat the iterative procedure until the termination percentage of detected positions remains for consideration. For example, and without limitation, the termination percentage may be set to 50%, such that the iterative procedure ceases when 50% or fewer of the original detected positions remain for the iterative process. Otherwise stated, the iterative procedure ceases when 50% of the original detected positions have been deleted and/or disregarded. The termination percentage may be any percentage less than 50%, equal to 50%, or greater than 50%. According to another aspect of the disclosure, the termination percentage may be 60%.

The termination factor may be a number of iterations. That is, the procedure may be configured for a finite number of iterative repetitions. After the finite number of iterative repetitions has been reached, the procedure ceases. Without limitation, the number of iterations may be selected based on any of the quantity of detected positions, processing power, duration of time, or otherwise. Without limitation, the number of iterative repetitions may be 1 to 5 repetitions, 5 to 10 repetitions, or greater than ten repetitions.

The images may be gathered from one or more unmanned aerial vehicles. According to one aspect of the disclosure, a single unmanned aerial vehicle obtains a plurality of images of the image region by flying from one location to the next and obtaining images along the way. According to another aspect of the disclosure, two or more unmanned aerial vehicles may be deployed to obtain images of the image region. The number of unmanned aerial vehicles selected for obtaining images may range from one to the number of images ultimately obtained. According to another aspect of the disclosure, the images may be taken by a swarm of unmanned aerial vehicles.

The one or more unmanned aerial vehicles may be configured to obtain image data from a predefined image region. The image region may be predefined based on one or more absolute locations, a distance from one or more absolute locations, a region between two or more landmarks, or otherwise. The image region may be selected as a region on a map.

Alternatively, the one or more unmanned aerial vehicles may be preprogrammed to obtain images from a plurality of points, such that each image corresponds to a desired location. Under this configuration, they may be a necessary to predefine an image region; rather, in this case, the image region will be understood to be the image region corresponding to the totality of the obtained images.

Once the iterative procedure has terminated, and a final set of measurement locations has been obtained, the one or more processors may be configured to perform any of a variety of tasks using the measured locations. Without limitation, the one or more processors may be configured to perform one or more of the following: generate a map based at least on the final measured locations; determine a location of an image feature based at least on one or more final measured locations; determine a distance between two or more image features based at least on one or more final measured locations; and determine an area based on at least one or more final measured locations.

The unmanned aerial vehicle, according to various aspects, may include a camera gimbal having an independent two- or three-axes degree of freedom to properly track a target, e.g. a person or subject, with a tracking camera independently of an actual flight direction or actual attitude of the unmanned aerial vehicle. In some aspects, a depth camera may be used for tracking, monitoring the vicinity, providing images to a user of the UAV, etc. A depth camera may allow associating depth information with an image, e.g., to provide a depth image. This allows, for example, providing an image of the vicinity of the unmanned aerial vehicle including depth information about one or more objects depicted in the image. As an example, a depth image may include information to indicate a relative distance of objects displayed in the image. This distance information may be, but is not limited to, colors and/or shading to depict a relative distance from a sensor. Based on depth images, a three dimensional map may be constructed from the depth information. Said map construction may be achieved using a depth map engine, which may include one or more processors or a non-transitory computer readable medium configured to create a depth map from the depth information provided by the depth images. Three-dimensional image recreation from the plurality of two-dimensional images may be performed according to any method including, but not limited to, voxel-based recreation or point-cloud-based recreation. Where a point-cloud is used, the point-cloud may be created based on the received data and then optionally converted into a triangular model.

The unmanned aerial vehicle described herein can be in the shape of an airplane (e.g. a fixed wing airplane) or a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each of the propeller has at least one propeller blade. The propellers may be fixed pitch propellers.

According to one aspect of the disclosure, the one or more processors may be located on board each of the plurality of UAVs. Under this configuration, the one or more processors control each UAV to cause the UAV to obtain an image and to navigate with respect to the object. The one or more processors on the UAV may be controlled by one or more processors located external to the UAV for the purposes of issuing imaging commands or locational commands. For example, one or more processors located external to a UAV may transmit instructions to one or more UAVs including, but not limited to, instructions for an object location, a timing of a synchronized image, a distance from the object, or a delay following a trigger event for taking the synchronized image.

According to another aspect of the disclosure, the one or more image sensors on the UAV may be cameras. This may include cameras configured to take still images or video images. This may further include mono cameras or stereo cameras. That is, the camera may be equipped to take a two dimensional image, which will then be combined with other two-dimensional images from different vantage points to construct a three-dimensional image. Alternatively, the cameras may be a stereo camera or depth camera, which is equipped to take a three-dimensional image or image including depth information. These images with depth information may then be combined with other images to obtain a more accurate three-dimensional image or a three-dimensional image from various vantage points.

In the following, various examples are provided with reference to the aspects described above:

In Example 1, an image location iteration system is disclosed comprising one or more processors configured to: receive from one or more unmanned aerial vehicles a plurality of images and corresponding detected positions; determine an alignment of the plurality of images according to one or more image features; calculate a first set of measured locations for the plurality of images according to the alignment and the detected positions; and calculate a second set of measured locations the plurality of images according to the alignment and a first subset of the detected positions.

In Example 2, the image location iteration system of Example 1 is disclosed, wherein the one or more processors are further configured to order the first set of measured locations by a magnitude of difference between the measured locations and corresponding detected positions.

In Example 3, the image location iteration system of Example 1 or 2 is disclosed, wherein the first subset is a percentage of the detected positions with a smallest magnitude of difference between a detected position and a corresponding measured location.

In Example 4, the image location iteration system of Example 3 is disclosed, wherein the percentage is 90%.

In Example 5, the image location iteration system of any one of Examples 1 to 4 is disclosed, wherein the one or more processors are configured to disregard a percentage of the detected positions with a greatest magnitude of difference between a detected position and a corresponding measured location.

In Example 6, the image location iteration system of any one of Examples 1 to 5 is disclosed, wherein the one or more processors are further configured to calculate a third set of measured locations for the plurality of images according to a second subset of the detected positions and the alignment.

In Example 7, the image location iteration system of Example 6 is disclosed, wherein the one or more processors are further configured to order the second set of measured locations by a magnitude of difference between the measured locations and corresponding detected position.

In Example 8, the image location iteration system of Example 6 or 7 is disclosed, wherein the second subset is a percentage of the detected positions with a smallest magnitude of difference between a detected position and a corresponding measured location.

In Example 9, the image location iteration system of Example 8 is disclosed, wherein the percentage is 90%.

In Example 10, the image location iteration system of any one of Examples 1 to 9 is disclosed, wherein the one or more processors are configured to disregard a percentage of the detected positions with a greatest magnitude of difference between a detected position and a corresponding measured location.

In Example 11, the image location iteration system of any one of Examples 1 to 10 is disclosed, wherein the one or more processors are further configured to repeat the iterative process until a termination factor is reached.

In Example 12, the image location iteration system of Example 11 is disclosed, wherein the termination factor is a percentage of detected positions remaining for consideration.

In Example 13, the image location iteration system of Example 12 is disclosed, wherein the termination factor is a percentage of detected positions remaining in a most recently calculated subset of detected positions.

In Example 14, the image location iteration system of any one of Examples 12 or 13 is disclosed, wherein the termination percentage is 60%.

In Example 15, the image location iteration system of any one of Examples 12 or 13 is disclosed, wherein the termination percentage is 50%.

In Example 16, the image location iteration system of Example 11 is disclosed, wherein the termination factor is a number of iterations.

In Example 17, the image location iteration system of Example 16 is disclosed, wherein the number of iterations is 5.

In Example 18, the image location iteration system of Example 16 is disclosed, wherein the number of iterations is between 5 and 10.

In Example 19, the image location iteration system of Example 16 is disclosed, wherein the number of iterations is 16.

In Example 20, the image location iteration system of any one of Examples 1 to 19 is disclosed, wherein the images are obtained by a single unmanned aerial vehicle.

In Example 21, the image location iteration system of any one of Examples 1 to 19 is disclosed, wherein the images are obtained by a plurality of unmanned aerial vehicles.

In Example 22, the image location iteration system of any one of Examples 1 to 21 is disclosed, further comprising one or more unmanned aerial vehicles comprising: one or more image sensors, configured to obtain at least one image; a position detector, configured to detect a position of the unmanned aerial vehicle when the at least one image is generated; an image positioning circuit, configured to associate the at least one image with a corresponding detected position.

In Example 23, the image location iteration system of any one of Example 22 is disclosed, wherein the one or more unmanned aerial vehicles are further configured to obtain the plurality of images from a predefined image region.

In Example 24, the image location iteration system of Examples 22 to 23 is disclosed, wherein the one or more unmanned aerial vehicles are further configured to obtain the plurality of images from a plurality of predetermined locations.

In Example 25, the image location iteration system of any one of Examples 22 to 23 is disclosed, wherein the one or more unmanned aerial vehicles are further configured to obtain the plurality of images such that each of the plurality of images overlaps with at least one other image within the plurality of images.

In Example 26, the image location iteration system of any one of Examples 1 to 25 is disclosed, wherein the one or more processors are further configured to generate a map corresponding to a region comprising the plurality of images.

In Example 27, a method of image location iteration is disclosed comprising: obtaining a plurality of images; detecting positions from which the plurality of images were obtained; associating the plurality of images with corresponding detected positions; determining an alignment of the plurality of images according to one or more image features; calculating a first set of measured locations for the plurality of images according to the alignment and the detected positions; and calculating a second set of measured locations the plurality of images according to the alignment and a first subset of the detected positions.

In Example 28, the method of image location iteration of Example 27 is disclosed, further comprising ordering the first set of measured locations by a magnitude of difference between the measured locations and corresponding detected positions.

In Example 29, the method of image location iteration of Example 27 or 28 is disclosed, wherein the first subset is a percentage of the detected positions with a smallest magnitude of difference between a detected position and a corresponding measured location.

In Example 30, the method of image location iteration of Example 29 is disclosed, wherein the percentage is 90%.

In Example 31, the method of image location iteration of any one of Examples 27 to 30 is disclosed, further comprising disregarding a percentage of the detected positions with a greatest magnitude of difference between a detected position and a corresponding measured location.

In Example 32, the method of image location iteration of any one of Examples 27 to 31 is disclosed, further comprising calculating a third set of measured locations for the plurality of images according to a second subset of the detected positions and the alignment.

In Example 33, the method of image location iteration of Example 32 is disclosed, further comprising ordering the second set of measured locations by a magnitude of difference between the measured locations and corresponding detected position.

In Example 34, the method of image location iteration of Example 32 or 33 is disclosed, wherein the second subset is a percentage of the detected positions with a smallest magnitude of difference between a detected position and a corresponding measured location.

In Example 35, the method of image location iteration of Example 34 is disclosed, wherein the percentage is 90%.

In Example 36, the method of image location iteration of any one of Examples 27 to 35 is disclosed, further comprising disregarding a percentage of the detected positions with a greatest magnitude of difference between a detected position and a corresponding measured location.

In Example 37, the method of image location iteration of any one of Examples 27 to 36 is disclosed, further comprising repeating the iterative process until a termination factor is reached.

In Example 38, the method of image location iteration of Example 37 is disclosed, wherein the termination factor is a percentage of detected positions remaining for consideration.

In Example 39, the method of image location iteration of Example 38 is disclosed, wherein the termination factor is a percentage of detected positions remaining in a most recently calculated subset of detected positions.

In Example 40, the method of image location iteration of any one of Examples 38 or 39 is disclosed, wherein the termination percentage is 60%.

In Example 41, the method of image location iteration of any one of Examples 38 or 39 is disclosed, wherein the termination percentage is 50%.

In Example 42, the method of image location iteration of Example 37 is disclosed, wherein the termination factor is a number of iterations.

In Example 43, the method of image location iteration of Example 42 is disclosed, wherein the number of iterations is 5.

In Example 44, the method of image location iteration of Example 42 is disclosed, wherein the number of iterations is between 5 and 10.

In Example 45, the method of image location iteration of Example 42 is disclosed, wherein the number of iterations is 16.

In Example 46, the method of image location iteration of any one of Examples 27 to 45 is disclosed, wherein the images are obtained by a single unmanned aerial vehicle.

In Example 47, the method of image location iteration of any one of Examples 27 to 45 is disclosed, wherein the images are obtained by a plurality of unmanned aerial vehicles.

In Example 48, the method of image location iteration of any one of Examples 27 to 47 is disclosed, further comprising obtaining the plurality of images from a predefined image region.

In Example 49, the method of image location iteration of any one of Examples 27 to 48 is disclosed, wherein the one or more unmanned aerial vehicles are further configured to obtain the plurality of images from a plurality of predetermined locations.

In Example 50, the method of image location iteration of any one of Examples 27 to 49 is disclosed, wherein each of the plurality of images overlaps with at least one other image within the plurality of images.

In Example 51, the method of image location iteration of any one of Examples 27 to 51 is disclosed, further comprising generating a map corresponding to a region comprising the plurality of images.

In Example 52, an image location iteration means is disclosed comprising one or more processing means configured to receive from one or more unmanned aerial vehicles a plurality of images and corresponding detected positions; determine an alignment of the plurality of images according to one or more image features; calculate a first set of measured locations for the plurality of images according to the alignment and the detected positions; and calculate a second set of measured locations the plurality of images according to the alignment and a first subset of the detected positions.

In Example 53, the image location iteration means of Example 52 is disclosed, further comprising ordering the first set of measured locations by a magnitude of difference between the measured locations and corresponding detected positions.

In Example 54, the image location iteration means of Example 52 or 53 is disclosed, wherein the first subset is a percentage of the detected positions with a smallest magnitude of difference between a detected position and a corresponding measured location.

In Example 55, the image location iteration means of Example 54 is disclosed, wherein the percentage is 90%.

In Example 56, the image location iteration means of any one of Examples 52 to 55 is disclosed, wherein the one or more processing means are configured to disregard a percentage of the detected positions with a greatest magnitude of difference between a detected position and a corresponding measured location.

In Example 57, the image location iteration means of any one of Examples 52 to 56 is disclosed, wherein the one or more processing means are further configured to calculate a third set of measured locations for the plurality of images according to a second subset of the detected positions and the alignment.

In Example 58, the image location iteration means of Example 57 is disclosed, further comprising ordering the second set of measured locations by a magnitude of difference between the measured locations and corresponding detected position.

In Example 59, the image location iteration means of Example 57 or 58 is disclosed, wherein the second subset is a percentage of the detected positions with a smallest magnitude of difference between a detected position and a corresponding measured location.

In Example 60, the image location iteration means of Example 59 is disclosed, wherein the percentage is 90%.

In Example 61, the image location iteration means of any one of Examples 52 to 60 is disclosed, wherein the one or more processing means are configured to disregard a percentage of the detected positions with a greatest magnitude of difference between a detected position and a corresponding measured location.

In Example 62, the image location iteration means of any one of Examples 52 to 61 is disclosed, wherein the one or more processing means are further configured to repeat the iterative process until a termination factor is reached.

In Example 63, the image location iteration means of Example 62 is disclosed, wherein the termination factor is a percentage of detected positions remaining for consideration.

In Example 64, the image location iteration means of Example 63 is disclosed, wherein the termination factor is a percentage of detected positions remaining in a most recently calculated subset of detected positions.

In Example 65, the image location iteration means of any one of Examples 63 or 64 is disclosed, wherein the termination percentage is 60%.

In Example 66, the image location iteration means of any one of Examples 63 or 64 is disclosed, wherein the termination percentage is 50%.

In Example 67, the image location iteration means of Example 62 is disclosed, wherein the termination factor is a number of iterations.

In Example 68, the image location iteration means of Example 67 is disclosed, wherein the number of iterations is 5.

In Example 69, the image location iteration means of Example 67 is disclosed, wherein the number of iterations is between 5 and 10.

In Example 70, the image location iteration means of Example 67 is disclosed, wherein the number of iterations is 16.

In Example 71, the image location iteration means of any one of Examples 52 to 70 is disclosed, wherein the images are obtained by a single unmanned aerial vehicle.

In Example 72, the image location iteration means of any one of Examples 52 to 70 is disclosed, wherein the images are obtained by a plurality of unmanned aerial vehicles.

In Example 73, the image location iteration means of any one of Examples 52 to 72 is disclosed, further comprising: one or more unmanned aerial vehicles comprising one or more image sensors, configured to obtain at least one image; a position detector, configured to detect a position of the unmanned aerial vehicle when the at least one image is generated; an image positioning circuit, configured to associate the at least one image with a corresponding detected position;

In Example 74, the image location iteration means of any one of Example 73 is disclosed, wherein the one or more unmanned aerial vehicles are further configured to obtain the plurality of images from a predefined image region.

In Example 75, the image location iteration means of Examples 73 to 74 is disclosed, wherein the one or more unmanned aerial vehicles are further configured to obtain the plurality of images from a plurality of predetermined locations.

In Example 76, the image location iteration means of any one of Examples 73 to 74 is disclosed, wherein each of the plurality of images overlaps with at least one other image within the plurality of images.

In Example 77, the image location iteration means of any one of Examples 52 to 76 is disclosed, wherein the one or more processing means are further configured to generate a map corresponding to a region comprising the plurality of images.

In Example 78, a non-transient computer readable medium is disclosed, configured to carry out any one of the methods of Examples 26 to 50.

In Example 79, an image location iteration system is disclosed comprising one or more unmanned aerial vehicles comprising one or more image sensors, configured to obtain at least one image; a position detector, configured to detect a position of the unmanned aerial vehicle when the at least one image is generated; an image positioning circuit, configured to associate the at least one image with a corresponding detected position; one or more processors configured to receive from the one or more unmanned aerial vehicles a plurality of images and corresponding detected positions; determine an alignment of the plurality of images according to one or more image features; calculate a first set of measured locations for the plurality of images according to the alignment and the detected positions; and calculate a second set of measured locations the plurality of images according to the alignment and a first subset of the detected positions.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An image location iteration system comprising one or more processors configured to:
   receive from one or more unmanned aerial vehicles a plurality of images and corresponding detected positions;
   determine an alignment of the plurality of images according to one or more image features;
   calculate a first set of measured locations for the plurality of images according to the alignment and the detected positions; and
   calculate a second set of measured locations the plurality of images according to the alignment and a first subset of the detected positions.

2. The image location iteration system of claim 1, wherein the one or more processors are further configured to order the first set of measured locations by a magnitude of difference between the measured locations and corresponding detected positions.

3. The image location iteration system of claim 2, wherein the first subset is a percentage of the detected positions with a smallest magnitude of difference between a detected position and a corresponding measured location.

4. The image location iteration system of claim 3, wherein the percentage is 90%.

5. The image location iteration system of claim 1, wherein the one or more processors are configured to disregard a percentage of the detected positions with a greatest magnitude of difference between a detected position and a corresponding measured location.

6. The image location iteration system of claim 1, wherein the one or more processors are further configured to calculate a third set of measured locations for the plurality of images according to a second subset of the detected positions and the alignment.

7. The image location iteration system of claim 1, wherein the one or more processors are further configured to repeat the iterative process until a termination factor is reached.

8. The image location iteration system of claim 7, wherein the termination factor is a percentage of detected positions remaining for consideration.

9. The image location iteration system of claim 8, wherein the termination percentage is 60%.

10. The image location iteration system of claim 7, wherein the termination factor is a number of iterations.

11. The image location iteration system of claim 1, further comprising:
    one or more unmanned aerial vehicles comprising:
        one or more image sensors, configured to obtain at least one image;
        a position detector, configured to detect a position of the unmanned aerial vehicle when the at least one image is generated;
        an image positioning circuit, configured to associate the at least one image with a corresponding detected position.

12. A method of image location iteration comprising:
    obtaining from one or more unmanned aerial vehicles a plurality of images;
    detecting positions from which the plurality of images were obtained;
    associating the plurality of images with corresponding detected positions;
    determining an alignment of the plurality of images according to one or more image features;

calculating a first set of measured locations for the plurality of images according to the alignment and the detected positions; and calculating a second set of measured locations the plurality of images according to the alignment and a first subset of the detected positions.

13. The method of image location iteration of claim 12, further comprising ordering the first set of measured locations by a magnitude of difference between the measured locations and corresponding detected positions.

14. The method of image location iteration of claim 13, wherein the first subset is a percentage of the detected positions with a smallest magnitude of difference between a detected position and a corresponding measured location.

15. The method of image location iteration of claim 14, wherein the percentage is 90%.

16. The method of image location iteration of claim 12, further comprising disregarding a percentage of the detected positions with a greatest magnitude of difference between a detected position and a corresponding measured location.

17. The method of image location iteration of claim 12, wherein the images are obtained by a single unmanned aerial vehicle.

18. The method of image location iteration of claim 12, wherein the images are obtained by a plurality of unmanned aerial vehicles.

19. The method of image location iteration of claim 12, further comprising obtaining the plurality of images from a predefined image region.

20. An image location iteration system comprising:
one or more unmanned aerial vehicles comprising:
one or more image sensors, configured to obtain at least one image;
a position detector, configured to detect a position of the unmanned aerial vehicle when the at least one image is generated;
an image positioning circuit, configured to associate the at least one image with a corresponding detected position;
one or more processors configured to:
receive from the one or more unmanned aerial vehicles a plurality of images and corresponding detected positions;
determine an alignment of the plurality of images according to one or more image features;
calculate a first set of measured locations for the plurality of images according to the alignment and the detected positions; and
calculate a second set of measured locations the plurality of images according to the alignment and a first subset of the detected positions.

* * * * *